United States Patent [19]

Gregory et al.

[11] Patent Number: 5,396,383
[45] Date of Patent: Mar. 7, 1995

[54] INTEGRAL LUBRICATING FLUID DELIVERY SYSTEM FOR A FLYING HEAD IN A MAGNETIC DISK STORAGE SYSTEM

[75] Inventors: Thomas A. Gregory, Rochester, Minn.; Christopher G. Keller, Albany, Calif.

[73] Assignee: International Business Machines, Armonk, N.Y.

[21] Appl. No.: 997,098

[22] Filed: Dec. 29, 1992

[51] Int. Cl.6 .................. G11B 33/14; G11B 21/21; G11B 23/50
[52] U.S. Cl. .................. 360/97.02; 369/258
[58] Field of Search .......... 360/97.01, 97.02, 98.02, 360/102, 103; 369/258, 275.5; 428/694 TP, 694 BP, 695, 900

[56] References Cited

U.S. PATENT DOCUMENTS

| 2,928,709 | 3/1960 | Baumeister | 346/74 |
| 2,969,435 | 1/1961 | Lynott | 360/103 |
| 4,327,139 | 4/1982 | Schaefer et al. | 428/695 |
| 4,626,941 | 12/1986 | Sawada et al. | 360/98.02 |
| 4,789,913 | 12/1988 | Gregory et al. | 360/97.02 |
| 5,041,932 | 8/1991 | Hamilton | 360/104 |
| 5,138,506 | 8/1992 | Beck et al. | 360/97.02 |
| 5,143,787 | 9/1992 | Frew et al. | 428/695 |
| 5,200,867 | 4/1993 | Albrecht et al. | 360/103 |
| 5,223,342 | 6/1993 | Shoji et al. | 360/97.01 |

FOREIGN PATENT DOCUMENTS 367510 10/1989 European Pat. Off. .

Primary Examiner—John H. Wolff
Assistant Examiner—George J. Letscher
Attorney, Agent, or Firm—Hugh D. Jaeger

[57] ABSTRACT

An integrated head-suspension-wick system having lubrication, including a bearing area at one end that holds a magnetic transducer against the disk. The invention provides wicking grooves in the integrated head-suspension-wick arm. The grooves are shaped to cause capillary forces to pull the lubricant from the supply wick on the arm, along the suspension of the bearing area. This ensures that the disk area under the head will not go dry regardless of storage duration or conditions. When the disk is running, the wick continues to conduct lubricant to the disk surface.

20 Claims, 3 Drawing Sheets

INTEGRAL LUBRICATING FLUID DELIVERY SYSTEM FOR A FLYING HEAD IN A MAGNETIC DISK STORAGE SYSTEM

BACKGROUND OF THE INVENTION

1. Technical Field - Field of the Invention

The present invention pertains to random access disk storage systems, and in particular, to system for continuous application of a lubricant to the surface of a magnetic storage disk to facilitate non-destructive start and operation of a flying head or slider.

2. Description of the Prior Art

The density of magnetic recording is inversely related to the height of the magnetic transducer above the disk surface. As a general proposition, increased storage capacity is obtainable by flying the heads closer to the disk surface. As the heads approach very closely, some contact with the disk surface is inevitable. This is particularly the case during the period of time while the disk is being brought up to operating speed and to a stop.

Lubricants have been applied to the disk surface as a part of the manufacturing process. This technique, although presenting contamination problems and potential loss of lubricant due to spin-off, has been generally adequate to satisfy requirements for prior art systems. However, as the head-disk spacing decreases and the application of lubricant is applied only during the manufacturing process is inadequate to ensure reliable performance over the life of the disk file.

The continuous application of a lubricant to the surface of the disk has been known since almost the very beginning of disk file development. For example, U.S. Pat. No. 2,969,435 "Oil Film Spacer for Magnetic Recording Device" to Lynott, issued Jan. 24, 1961, and assigned to the assignee of the present invention, shows a magnetic transducer having an oil discharge port located ahead of the flying surface of the transducer. Oil is pumped through the port to coat the surface of the disk and provide a lubricating film on which the transducer rides.

The lubrication requirements for near contact recording devices necessitates the use of a low viscosity lubricant to permit the requisite close approach of the slider to the disk surface. A low viscosity lubricant will drain away from the disk over time, and also migrate to the coolest spot in the disk drive enclosure, as a result of evaporation and condensation, which spot will be likely to be somewhere on the cover and not on the desired disk location. Because of the lubricant movement away from the point where it is needed, the lubricant dispenser must be very near the slider in the start/stop zone when the disk storage system is at rest. The main concern is lubrication under the head at the instant of start up.

Various systems for transporting the lubricant to the desired location near the slider have been considered, beginning with the pressurized reservoir and feed approach taught by the Lynott patent. Unfortunately, the complexity and resulting cost of the pressurized feed approach make it an altogether unsatisfactory approach to the current problem and alternatives have been sought. Ideally, the lubrication delivery system would not require additional power in the form of a pump. The system should not require a sequencing delay in start up to accommodate lubricant flow prior to initiating rotation. The delivery system should provide an adequate supply of lubricant from the very outset of startup.

It has been recognized that the use of a wick to convey the surface lubricant to the slider is an approach which overcomes many of the difficulties associated with other approaches. However, to adequately supply the lubricant, particularly at startup, the wick would have to be in intimate contact with the disk. Use of an applicator in intimate contact with a disk introduces contaminants to the lubricant and also adds to the complexity of the overall mechanical actuator system as the applicator has to move with the slider. This is obviously not a practical solution since such a design would be very complicated and, at best, completely subvert the very sophisticated slider suspension system.

DISCLOSURE OF THE INVENTION - SUMMARY OF THE INVENTION

The present invention provides a lubricant delivery wicking structure for a hard drive disk storage system which provides a flow of lubricant directly to the slider while the disk surface is at rest or in motion. Lubricant fluid is delivered from a fabricated reservoir to a region near the slider via a flexible wick. A plurality of capillary grooves in the integral head-suspension-wick arm convey the lubricant to the lower surface of the slider to provide lubricant beneath and about the lower slider surface. Since the capillary grooves terminate in the lower portion of the slider adjacent the disk surface, the system provides for safe disk start up by ensuring that adequate lubricant exists between the lower slider surface and the surface of a disk. The system also provides for a continuous lubricant supply while the disk is rotating by recovering excess lubricant which is spun off of the disk surface in a fabric-lined reservoir for redistribution via the wicking and capillary devices.

According to one embodiment of the present invention there is provided an integral head-suspension-wick system. The integral head-suspension-wick arm is mounted on the shaft of a rotary actuator. A fabric-lined lubricant reservoir delivers lubricant via a flexible wick and a plurality of capillary grooves on the integral head-suspension-wick arm to the head overlying a disk surface.

One significant aspect and feature of the present invention is the transport of lubrication fluid from a reservoir to the head disk interface by the flexible wick and capillary grooves.

Another significant aspect and feature of the present invention is the use of capillary grooves incorporated on the underside of an integral head-suspension-wick arm.

Yet another significant aspect and feature of the present invention is a meniscus of lubricant about the head and between the head and the disk surface.

Still another significant aspect and feature of the present invention is providing lubricating fluid to the region of the slider contact with the disk surface prior to start up.

A further significant aspect and feature of the present invention is a method of collecting and reusing excess lubricant on a spinning disk.

Having thus described one embodiment of the present invention, it is the principal object hereof to provide an integral head-suspension-wick system for lubrication of the region between a hard drive head and magnetic disk surface for static, start up, and operational modes.

BRIEF DESCRIPTION OF THE DRAWINGS

FIG. 2b illustrates an alternative groove configuration to that of FIG. 2a;

DESCRIPTION OF THE INVENTION - DETAILED DESCRIPTION OF THE PREFERRED EMBODIMENTS

Figure 1:
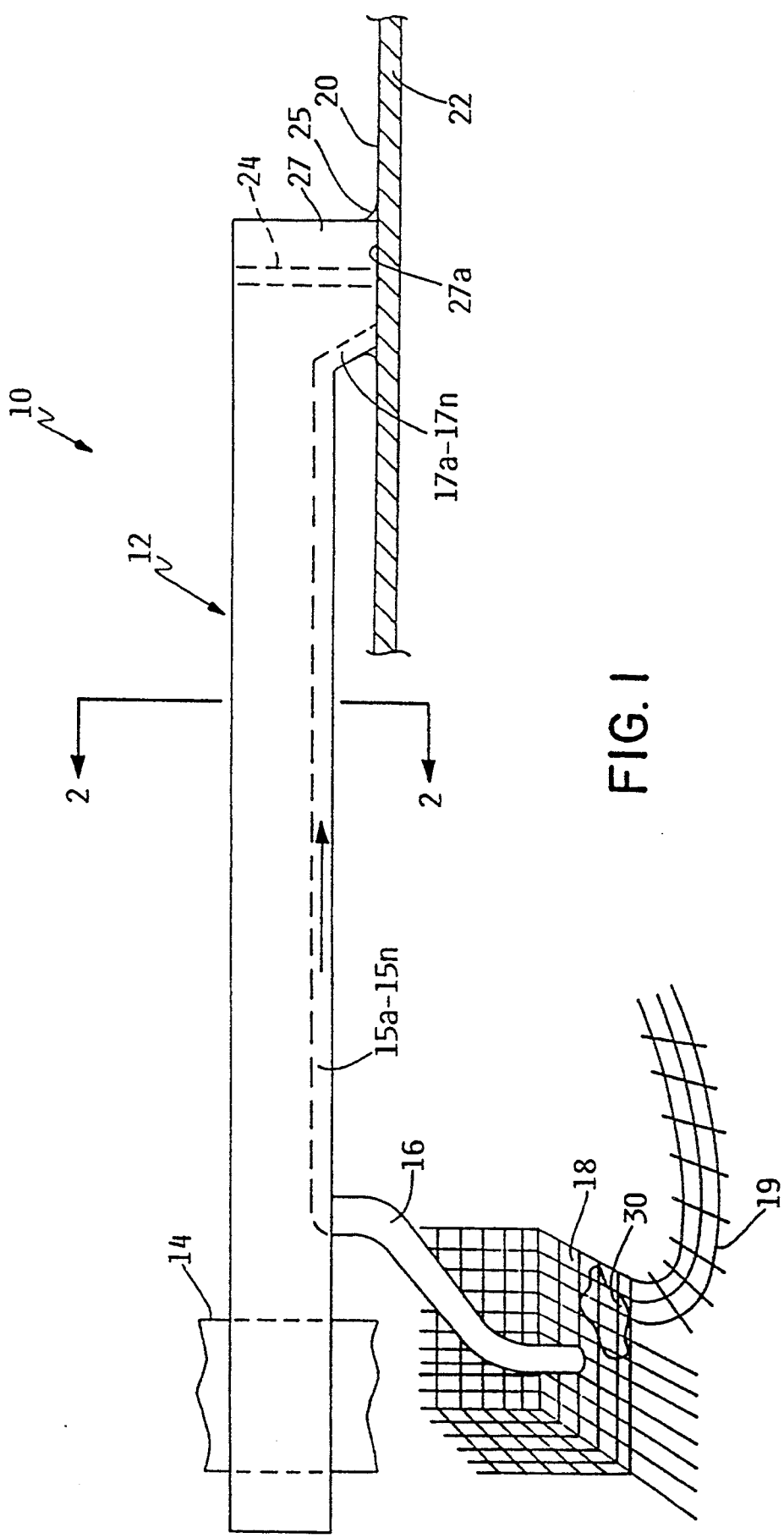
FIG. 1 illustrates a side view of the integral head-suspension-wick system of the present invention.

FIG. 1 illustrates a plan view of an integral head-suspension-wick system 10 for magnetic recording, including an integrated head-suspension-wick arm assembly 12 mounted on a rotary actuator shaft 14. The actuator shaft 14 is driven by a suitable magnetic actuator to position the magnetic record head over the desired magnetic track on the storage disk.

Capillary grooves 15a–15n on an underside of the integral housing-suspension-wick arm assembly 12 transport lubricant from a wick 16, which is attached to a lubricant scavenging system 18 or reservoir to a disk surface 20 of a magnetic storage disk 22. The lubricant scavenging system or reservoir 18 includes a lubricant scavenger or fabric-like lining 19 which covers the inside of the disc enclosure. A read/write transducer 24 is imbedded inside the integral housing-suspension-wick arm assembly 12 in a location which allows reading and writing on the surface 20 of the magnetic disk 22.

Lubricating liquid 30 residing in the fabric-like portion of lubricant scavenger 19 is wicked to the capillary grooves 15a–15n on the underside of the integral head-suspension-wick arm 12. Capillary action along the capillary grooves 15a–15n drives lubricating liquid 30 to the bottom surface of the head 27 where a lubrication film meniscus 25 is formed between the head 27 and the surface 20 of the disk 22, thus offering a film of lubricant, which is disposed between the bottom surface 27a and the disk surface 20 to facilitate lubrication of the head disk interface during the start up operation. The meniscus 25 stems the flow of lubricating liquid 30 to the disk surface 20, and thereby provides a self-limiting action. This is an important feature, since it prevents excess lubricating liquid 30 from being applied to the disk surface 20 when the disk 22 is at rest. The meniscus 25 is destroyed by the rotational action of the disk to allow continuous capillary flow of lubricating fluid through the wick 16 and along the capillary grooves 15a–15n in the arm 12.

Figure 2A:
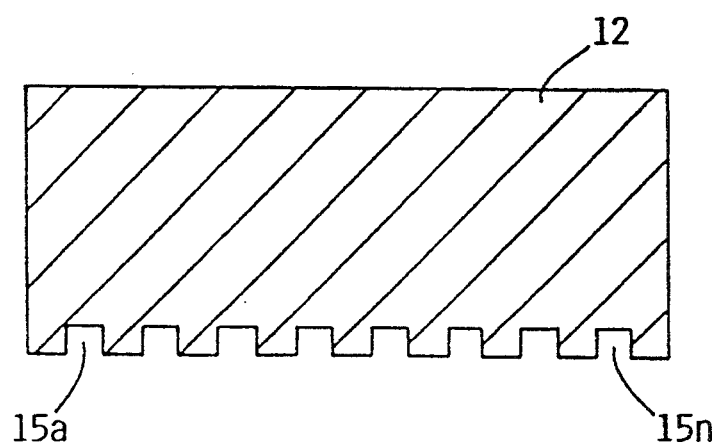
FIG. 2a illustrates a cross-sectional view along line 2—2 of FIG. 1.

FIG. 2a illustrates a cross-sectional view along line 2—2 of FIG. 1 of the integral housing-suspension-wick arm assembly 12 where all numerals correspond to those elements previously described. Illustrated in particular are the capillary grooves 15a–15n aligned along the lower surface of the integral head-suspension-wick arm assembly 12 for transfer of lubricating liquid 30 to the head 27 of FIG. 1. The integral head-suspension-wick arm assembly 12 is made by conventional thin film, sputtering, plating and etching techniques. The wicking grooves 15a–15n are added by simple modification of the masks used in the existing processes and subsequent etching. Alternatively, an additional etching step can be added at the end specifically for the purpose of defining capillary grooves 15a–15n.

Figure 2B:
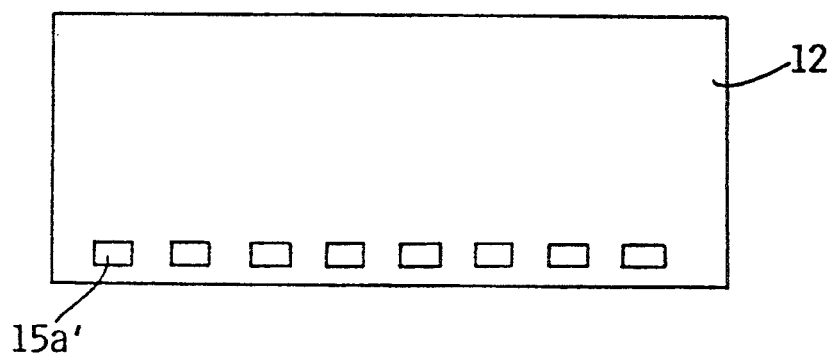

FIG. 2b illustrates an alternative groove configuration to that of FIG. 2a. In the alternative configuration, the capillary grooves 15a'–15n' are completely enclosed tubes within the integral housing-suspension-wick arm assembly 12.

While FIGS. 2a and 2b illustrate the preferred configurations, it will be appreciated that the grooves can be replaced with other, equivalent capillary means such as a porous or roughened surface on the integral housing-suspension-wick arm assembly 12.

Figure 3:
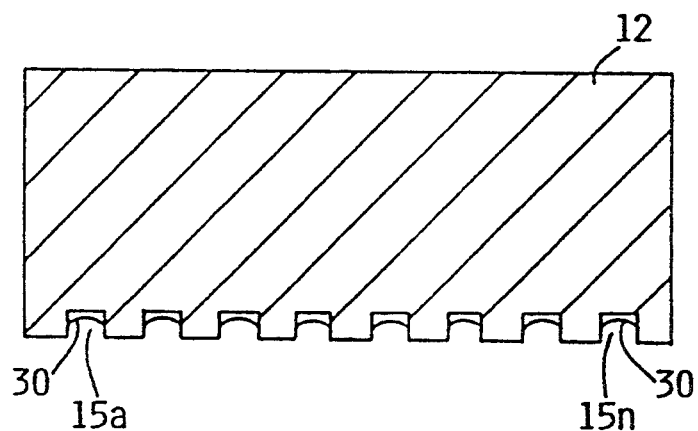
FIG. 3 illustrates capillary lubricant flow along the capillary grooves of FIG. 2; and, FIG. 4 is a schematic perspective view of a portion of a magnetic disk storage system utilizing the invention showing the lubricant recovery reservoir and shroud.

FIG. 3 illustrates lubricating liquid 30 being carried by capillary action along the capillary grooves 15a–15n where all numerals correspond to those elements previously described.

MODE OF OPERATION

Figure 4:
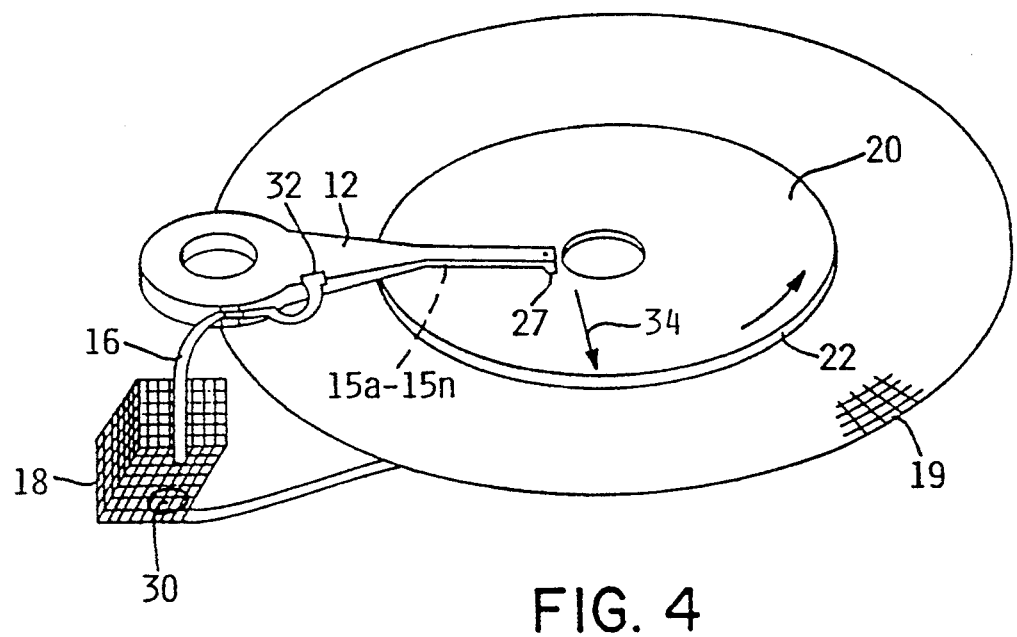

FIG. 4 best illustrates the mode of operation of the integral head-suspension-wick system 10 where all numerals correspond to those elements previously described. Lubrication for disk start up is discussed in FIG. 1 where lubrication is provided between the head 27 and the disk surface 20. The lubrication method for a spinning disk surface 20 employs the same components of FIG. 1 as now described in detail. The lubricant scavenging system or reservoir 18, which surrounds the periphery of the magnetic disk 22 to scavenge the fluid droplets propelled from the rim of the disk, is provided with a fabric lining 19 which is loaded with lubricating liquid 30, but not to the point of being excessively saturated or to the point of being dripping wet. The reservoir 18 extends beneath and around the sides of the disk 22 to collect lubricant which is spun from the disk 22. The reservoir can also extend over the top of the spinning disks. The reservoir 18 is not necessarily in the bottom of the disk drive enclosure. The reservoir 18 includes fabric lining located on the inside walls of the disk enclosure. The lower end of wick 16 is connected with the fabric lining 19 of the reservoir 18 and is flexible in construction so as not to impede or otherwise interfere with the movement of the integral head-suspension-wick arm assembly 12. The wick 16 is attached to the integral head-suspension-wick arm assembly 12 by one or more clips 32. The wick 16 can be made of the same fabric which forms the fabric lining 19. The upper end of the flexible wick 16 is held in contact with the capillary grooves 15a–15n on the underside of the integral head-suspension-wick arm assembly 12 at all times. The flexibility of the wick 16 accommodates rotational movement of the integral head-suspension-wick arm assembly 12, and each is substantially unaffected by the presence of the other. Lubricating liquid 30 delivered to the capillary grooves 15a–15n on the underside of the integral head-suspension-wick arm assembly 12 by the wick 16 is transferred by capillary action along the capillary grooves 15a–15n to the head 27 where it is distributed to the disk surface 20 by the angular portions 17a–17n of the capillary grooves 15a–15n. Any excessive lubricant residing on or delivered to the spinning disk 20 is forced to flow in radial fashion from the disk surface 20 by centrifugal force, as shown by arrow 34. Flung lubricant droplets impinge the fabric lining 19 of the reservoir 18. Fabric lining 19 is, in itself, a capillary network to redeliver lubricating liquid 30 to the wick 16 for subsequent lubricating action.

The major component of the preferred lubricant is a low viscosity fluid with a high pressure boundary lubricant (1-5%) by weight, dissolved in it. One example is hexadecane (99%) and stearic acid (1%). Another example is perfluorexane (99%) and Zdol 4000 (1%) which is a perfluoropolyether with a reactive n group including nonfunctional, monofunctional and difunctional n groups.

Figure 5:
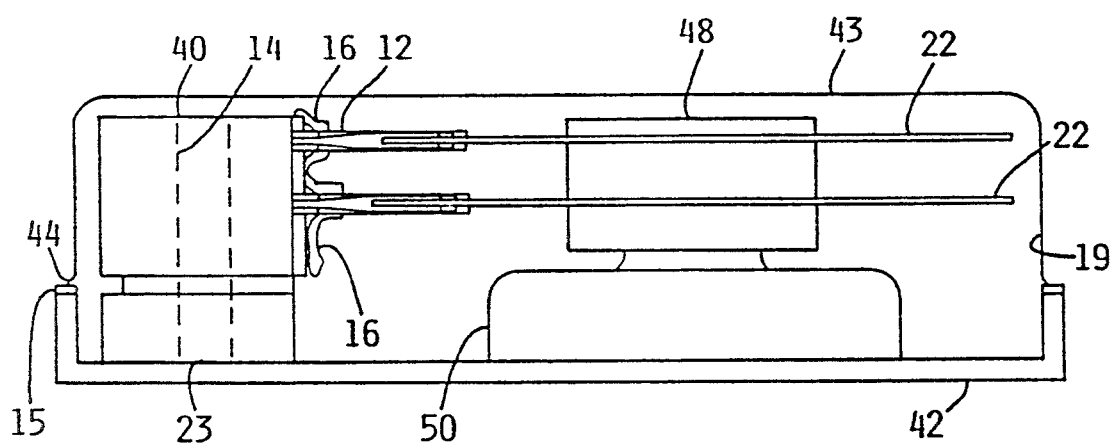
FIG. 5 is a vertical sectional view showing a disk drive incorporating the present invention.

FIG. 5 shows a sectional elevational view of a drive with the arm 12. Illustrated is a typical rigid disk drive with a rotary voice coil motor (VCM) driven actuator 40. The actuator 40 drives a head-arm assembly which includes the integral head-suspension-wick arm assembly 12. The head assembly 12 is contained with an enclosure including a cast base member 42 and a cover 43 which has a flange 44 that compresses a gasket 45 against the upper planar surface of the base member 42 to effect a seal. The rigid disk media 22 are carried by the hub 48 that is mounted to rotate in unison with the rotor of a spindle motor positioned within an upwardly extending depression in base member 42. The motor shaft extends through a bearing tower to connect to the hub 48.

The liquid lubricant used in the system of the present invention is required to be thermally stable, have a correct viscosity which is very low and be non-reactive. A simple, straight chain hydrocarbon with the desired low viscosity and a simple molecule that will not degrade is recommended. In operation, hexadecane has been used. Lubricants commonly used on disk surfaces, but having much reduced viscosity are satisfactory. However, with the greater quantity of lubricant used in the present technique as compared with the quantity required for the normal single application to the disk surface, the cost of the material becomes a factor in lubricant selection. A wick 16 is formed of porous material, such as plastic, ceramic or paper. The wick 16 must posses porosity to permit liquid lubricant to travel by capillary action from the reservoir 18 to the disk surface 20 in minute quantities to replenish and maintain a film of lubricant on the media surfaces. The material of the wick 16, in addition to providing a capillary path, must also not shed particles, and thereby become a source of particulate material within the enclosure. The film thickness should preferably be one micron and should not exceed 5 microns, since as the film thickness increases, the power required to drive the heads through the lubricant film increases. As the lubricant is spun off the disk and replaced, the lubricant scavenging system or reservoir 18 also functions as a lubricant filter to prevent the recirculation of particles captured in the liquid lubricant back to the media surfaces.

Various modifications can be made to the present invention without departing from the apparent scope hereof.

We claim:

1. In a system for delivering lubricating fluid to a head-disk interface of a slider positioned at the end of an actuator arm assembly to interact with a magnetic storage disk in a magnetic disk storage system, the improvement comprising:
   a. a fluid reservoir adjacent the periphery of a magnetic storage disk to scavenge fluid droplets propelled from the rim of said disk;
   b. capillary means extending along a portion of said arm assembly to the side of said slider abutting said disk, said capillary means including capillary grooves in said actuator arm to convey lubricant to a vicinity of the disk for deposition on a surface of said disk;
   c. a wick extending from said fluid reservoir to the inner terminus of said grooves; and,
   d. a lubricating fluid residing in said reservoir and adapted to be conveyed by said wick to the terminus of said capillary means and thence by said capillary means to the portion of said slider abutting a disk surface.

2. A system according to claim 1 in which said lubricating fluid is low viscosity fluid with a high pressure boundary lubricant dissolved therein.

3. A system according to claim 1 wherein said reservoir comprises a shroud about the periphery of said disk.

4. A system according to claim 3 in which said lubricating fluid assumes a meniscus in the region between said slider and said disk surface when said disk is at rest.

5. A system according to claim 4 in which said meniscus, once formed, provides a blocking action to inhibit further capillary flow of lubricating fluid over said capillary means.

6. A system according to claim 5 wherein said meniscus is destroyed by the rotational action of said disk surface to allow continuous capillary flow of lubricating fluid along said capillary means to the portion of said slider abutting said disk surface.

7. A system according to claim 1 wherein said wick extending from said reservoir to said inner terminus of said capillary means is flexible to provide for freedom of movement of said actuator arm with respect to said reservoir.

8. A system according to claim 1 wherein said capillary means comprise etched recesses in said arm.

9. A system according to claim 8 wherein said slider and portion of said actuator arm carrying said capillary grooves are an integral structure.

10. A system according to claim 2 wherein said low viscosity fluid is hexadecane and said high pressure boundary lubricant is stearic acid.

11. A system according to claim 10 wherein said low viscosity fluid is 99% by weight and said high pressure boundary lubricant is 1% by weight.

12. A system according to claim 11 wherein said low viscosity fluid is perfluorexane and said high pressure boundary lubricant is a perfluoropolyether with a reactive n group.

13. A system according to claim 1 wherein the fluid reservoir includes a fabric means portion.

14. A rotating memory device comprising:
   a. a rotary storage medium presenting a rotating data surface;
   b. an integral actuator arm which includes a transducer and includes a portion for transporting liquid lubricant;
   c. means for maintaining a recirculating film of liquid lubricant on said data surface, with a capillary means including capillary grooves in said actuator arm to convey lubricant to a vicinity of the medium for deposition on the surface of said rotary storage medium; and,
   d. said transducer being supported above said rotating surface by said liquid film when writing data to or reading data from said rotating data surface.

15. The rotating memory device of claim 14 wherein said storage medium is a rigid disk.

16. The rotating magnetic memory device of claim 14 wherein said means for maintaining a recirculating film comprises means for scavenging and recirculating said liquid lubricant over said data surface.

17. The rotating memory device of claim 16 further comprising a head-disk enclosure surrounding said rotating storage medium and said magnetic transducer.

18. The rotating memory device of claim 17 wherein said enclosure means hermetically seals said rotating storage medium and said magnetic transducer from the surrounding ambient atmosphere.

19. The rotating memory device of claim 16 wherein said means for recirculating said liquid lubricant over said data surface comprises a porous material lining the disk enclosure.

20. The rotating memory device of claim 16 wherein said means for recirculating said liquid lubricant includes a wick for transporting liquid lubricant to said integral arm.

* * * * *